(12) United States Patent
Kumar et al.

(10) Patent No.: US 11,956,342 B2
(45) Date of Patent: Apr. 9, 2024

(54) RELIABLE LINK MANAGEMENT FOR A HIGH-SPEED SIGNALING INTERCONNECT

(71) Applicant: NVIDIA Corporation, Santa Clara, CA (US)

(72) Inventors: Seema Kumar, Santa Clara, CA (US); Ish Chadha, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/988,551

(22) Filed: Nov. 16, 2022

(65) Prior Publication Data

US 2023/0208609 A1 Jun. 29, 2023

Related U.S. Application Data

(60) Provisional application No. 63/294,029, filed on Dec. 27, 2021.

(51) Int. Cl.
*H04L 7/00* (2006.01)

(52) U.S. Cl.
CPC .......... *H04L 7/0083* (2013.01); *H04L 7/0012* (2013.01)

(58) Field of Classification Search
CPC ..... H04L 7/0083; H04L 7/0012; H04L 25/14; H04L 7/0008; H04L 43/08; H04L 12/12; G06F 1/26; G06F 1/266; G06F 1/3209
See application file for complete search history.

(56) References Cited

U.S. PATENT DOCUMENTS 9,496,879 B1 * 11/2016 Duan ..................... H03L 7/0807
2016/0147684 A1 * 5/2016 Sengoku ............. G06F 13/4282
710/105

* cited by examiner

*Primary Examiner* — David S Huang
(74) *Attorney, Agent, or Firm* — Lowenstein Sandler LLP

(57) ABSTRACT

A system includes a link having one or more lanes associated with transmitting data and one or more lanes associated with transmitting a clock signal. The system includes a device coupled with the link, the device to receive a signal via the one or more lanes associated with transmitting the clock signal and determine a number of pulses associated with the signal over a period. The device is further to determine the number of pulses associated with the signal fail to satisfy a predetermined condition relating to a specified number of pulses for the period and initiate a power-down sequence in response to determining the number of pulses that fail to satisfy the predetermined condition relating to the specified number of pulses for the period.

20 Claims, 7 Drawing Sheets

RELIABLE LINK MANAGEMENT FOR A HIGH-SPEED SIGNALING INTERCONNECT

RELATED APPLICATION

This application claims the benefit of U.S. Provisional Patent Application No. 63/294,029, filed Dec. 27, 2021, which is incorporated by reference herein in its entirety.

TECHNICAL FIELD

At least one embodiment pertains to processing resources used to perform and facilitate high-speed communications. For example, at least one embodiment pertains to technology for reliable link management for a ground-referenced signaling (GRS) interconnect.

BACKGROUND

Communication systems transmit signals from a transmitter to a receiver via a communication channel or medium (e.g., cables, printed circuit boards, links, wirelessly, etc.) For example, the communication channel can communicate signals between devices or chips—e.g., a chip to chip (C2C) system. In some communication systems, the communication channel at one of the devices or chips can be powered down or reset by a respective software stack for fault containment or a controlled shutdown operation. Each chip can utilize a different software stack, so the respective software stack of the powered down or reset device cannot communicate with the other chip. Additionally, the software stack can be unable to control the physical communication channel itself due to security specifications of the communication system. This can cause the device to shut down or reset abruptly. When the communication channel shuts down abruptly, it can fail to follow proper power-down sequences causing additional stress on the communication channel and reducing the reliability of analog circuits of the communication channel over time.

BRIEF DESCRIPTION OF DRAWINGS

Various embodiments in accordance with the present disclosure will be described with reference to the drawings, in which.

DETAILED DESCRIPTION

Figure 1:
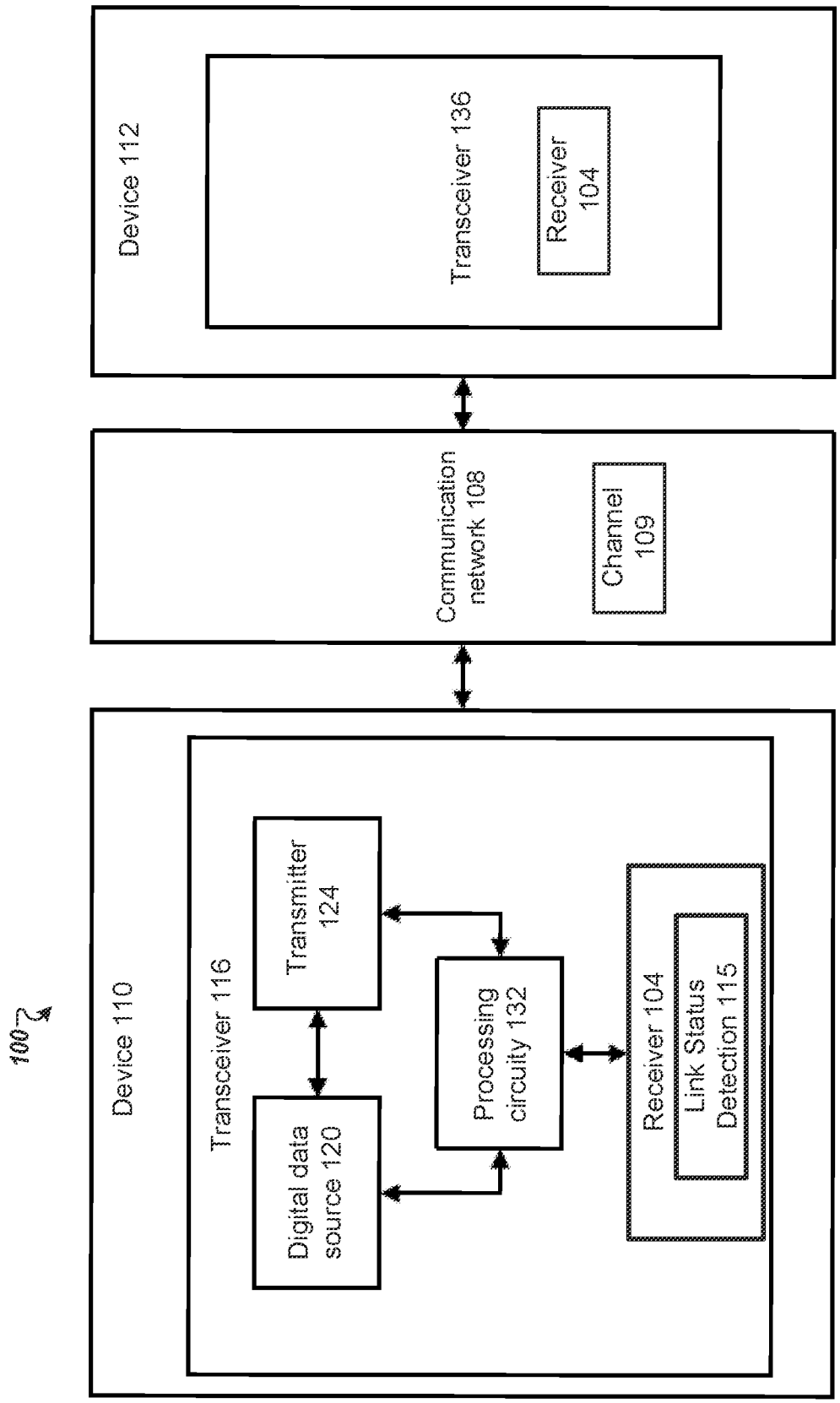
FIG. 1 is an example communication system employing a method for reliable link management, in accordance with at least some embodiments.

Communication systems transmit signals from a transmitter to a receiver via a communication channel or medium (e.g., cables, printed circuit boards, links, wirelessly, etc.). Some communication systems can include multiple devices executing separate, isolated software stacks. For example, the communication system can include a first device (e.g., a first integrated circuit (IC) or chip) and a second device (e.g., a second IC or chip) and communicate data via a ground-referenced signaling (GRS) link—e.g., the communication system may be a chip-to-chip (C2C) interconnect with both devices including a transmitter and a receiver. The first device and second device can execute isolated software stacks which can cause the first device and second device to be brought out of reset asynchronously—e.g., the first device or second device can be shut down or powered on at any time without the other device knowing. In some communication systems, the link can be powered-down or reset at either the first device or the second device by their respective software stack. Because the software stacks are isolated, the software stack powering down or resetting the link cannot communicate the power down or reset to the other device. Additionally, the respective software stack cannot access local physical link controls due to system security specifications. Accordingly, the power down and reset can be abrupt.

Some communication systems can shut down the link and components associated with the link (e.g., transmitter and receiver components) according to a power-down sequence. That is, components associated with and of the link can have a voltage range (e.g., below a maximum voltage threshold) within which they operate reliably based on a manufacturing process. Exceeding the voltage range can cause additional stress on the components and cause them to break down over time. For example, the communication system can shut down certain analog components of the transmitter and receiver according to the power-down sequence. When components are shut down or reset out of sequence (e.g., not according to the power-down sequence), long-term reliability of the components can be reduced. For example, if the power-down sequence is not followed and the receiver termination is disabled at the first device while a transmit equalization is enabled at the second device, the transmitter can undergo additional stress, and the performance of the transmitter is degraded. Additionally, if the first device stops transmitting a clock signal, a phase-lock loop (PLL) of the second device can begin to drift (e.g., become out of phase) as the PLL relies on the clock signal as a reference—e.g., relies on a forwarded clock signal for reference. When the shutdown or reset of the components is abrupt, the components associated with and of the link can be shutdown or reset out of sequence—e.g., when the respective software stack is unable to communicate the shutdown or reset to its local link components or the other device, the shutdown or reset can be out of sequence. Accordingly, the voltage range of some components can be exceeded and cause reliability issues.

Advantageously, aspects of the present disclosure can address the deficiencies above and other challenges by providing a method for reliable link management by detecting a status of a link coupling a first device and a second device via a clock lane. For example, each device can utilize link status detection circuitry in their receivers to monitor incoming signals and patterns on the clock lane. In some embodiments, each device can configure counter logic to determine a number of pulses received over a configurable period of time—e.g., the device can determine the average frequency of incoming patterns by detecting edges in the pattern for the period of time. If the device determines the incoming pattern does not correspond to a clock pattern associated with transmitting data (e.g., the number of pulses determined differs from an expected number of pulses associated with a clock signal for transmitting data), the device can determine the link or its associated components is down at the other side—e.g., at the other device. For example, a software stack of the first device can initiate a shutdown or reset of the link at the first device. In such embodiments, the first device can either begin to transmit a static pattern on the clock lane to indicate the first device is shutting down or resetting the link, or the first device can shutdown or reset the transmitter and stop driving a signal on the clock lane. In either case, the second device can continuously determine a number of pulses received over a configurable period of time. When the first device transmits the static pattern or stops driving a signal on the clock lane, the second device can determine if the number of pulses received over the configurable period does not match the expected number of pulses associated with a clock signal for transmitting data. Accordingly, the second device can determine the link is being powered down or reset at the first device and initiate its own power-down sequence. In some embodiments, the device can set longer or shorter periods of time based on how quickly the power-down sequence is to be initiated—e.g., if a transmitter of the second device has to be shutdown within a first period of time after a receiver of the first device is shutdown, the second device can set the period of time to be less than the first period.

Additionally, each device can include ramp-down (e.g., power down) circuitry configured to receive a link status—e.g., an indication of whether the determined number of pulses satisfies the expected number of pulses. The ramp-down circuitry can enable the device to initiate the power-down sequence when the device determines the link is powering down or resetting at the other device—e.g., the ramp-down circuitry can control the physical link controls to proceed with the power-down sequence. For example, when the device determines the link is powering down or resetting at the other device, the ramp-down circuitry can receive the indication and proceed to disable the transmitter equalization and the PLL of the receiver to maintain the reliability of the components. The ramp-down circuitry can also be configured to receive a reset signal from error circuitry or an indication from the respective software stack to power down and reset. Accordingly, even if the software stack does not have control of the physical link controls, the software stack can indicate the power down to the ramp-down circuitry, which can access the controls of the link and initiate the power-down sequence.

By utilizing the clock lane to monitor the link status, each device can properly execute the power-down sequence. That is, a device can quickly initiate a power-down sequence after determining the link is powering down or resetting at the other device without software intervention. Additionally, the solution can avoid circuits design with no reliability loopholes—e.g., circuits with no reliability loopholes can be costly to design and still cannot account for all situations. Accordingly, embodiments of the present application allow for a hardware-autonomous method for reliable link management (e.g., more reliable power down or resets of the link) in a high-speed interconnect system without the added design costs.

FIG. 1 illustrates an example communication system 100 according to at least one example embodiment. The system 100 includes a device 110, a communication network 108 including a communication channel 109, and a device 112. In at least one embodiment, devices 110 and 112 are two end-point devices in a computing system, such as a central processing unit (CPU) or graphics processing unit (GPU). In at least one embodiment, devices 110 and 112 are two servers. In at least one example embodiment, devices 110 and 112 correspond to one or more of a Personal Computer (PC), a laptop, a tablet, a smartphone, a server, a collection of servers, or the like. In some embodiments, the devices 110 and 112 may correspond to any appropriate type of device that communicates with other devices connected to a common type of communication network 108. According to embodiments, the receiver 104 of devices 110 or 112 may correspond to a GPU, a switch (e.g., a high-speed network switch), a network adapter, a CPU, a memory device, an input/output (I/O) device, other peripheral devices or components on a system-on-chip (SoC), or other devices and components at which a signal is received or measured, etc. As another specific but non-limiting example, the devices 110 and 112 may correspond to servers offering information resources, services, and/or applications to user devices, client devices, or other hosts in the system 100. In one example, devices 110 and 112 may correspond to network devices such as switches, network adapters, or data processing units (DPUs).

Examples of the communication network 108 that may be used to connect the devices 110 and 112 include an Internet Protocol (IP) network, an Ethernet network, an InfiniBand (IB) network, a Fibre Channel network, the Internet, a cellular communication network, a wireless communication network, a ground referenced signaling (GRS) link, combinations thereof (e.g., Fibre Channel over Ethernet), variants thereof, and/or the like. In one specific but non-limiting example, the communication network 108 is a network that enables data transmission between the devices 110 and 112 using data signals (e.g., digital, optical, wireless signals).

The device 110 includes a transceiver 116 for sending and receiving signals, for example, data signals. The data signals may be digital or optical signals modulated with data or other suitable signals for carrying data.

The transceiver 116 may include a digital data source 120, a transmitter 124, a receiver 104, and processing circuitry 132 that controls the transceiver 116. The digital data source 120 may include suitable hardware and/or software for outputting data in a digital format (e.g., in binary code and/or thermometer code). The digital data output by the digital data source 120 may be retrieved from memory (not illustrated) or generated according to input (e.g., user input).

The transmitter 124 includes suitable software and/or hardware for receiving digital data from the digital data source 120 and outputting data signals according to the digital data for transmission over the communication network 108 to a receiver 104 of device 112. Additional details of the structure of the transmitter 124 are discussed in more detail below with reference to the figures.

The receiver 104 of devices 110 and 112 may include suitable hardware and/or software for receiving signals, such as data signals from the communication network 108. For example, the receiver 104 may include components for receiving processing signals to extract the data for storing in a memory, as described in detail below with respect to FIG.

Figure 5:
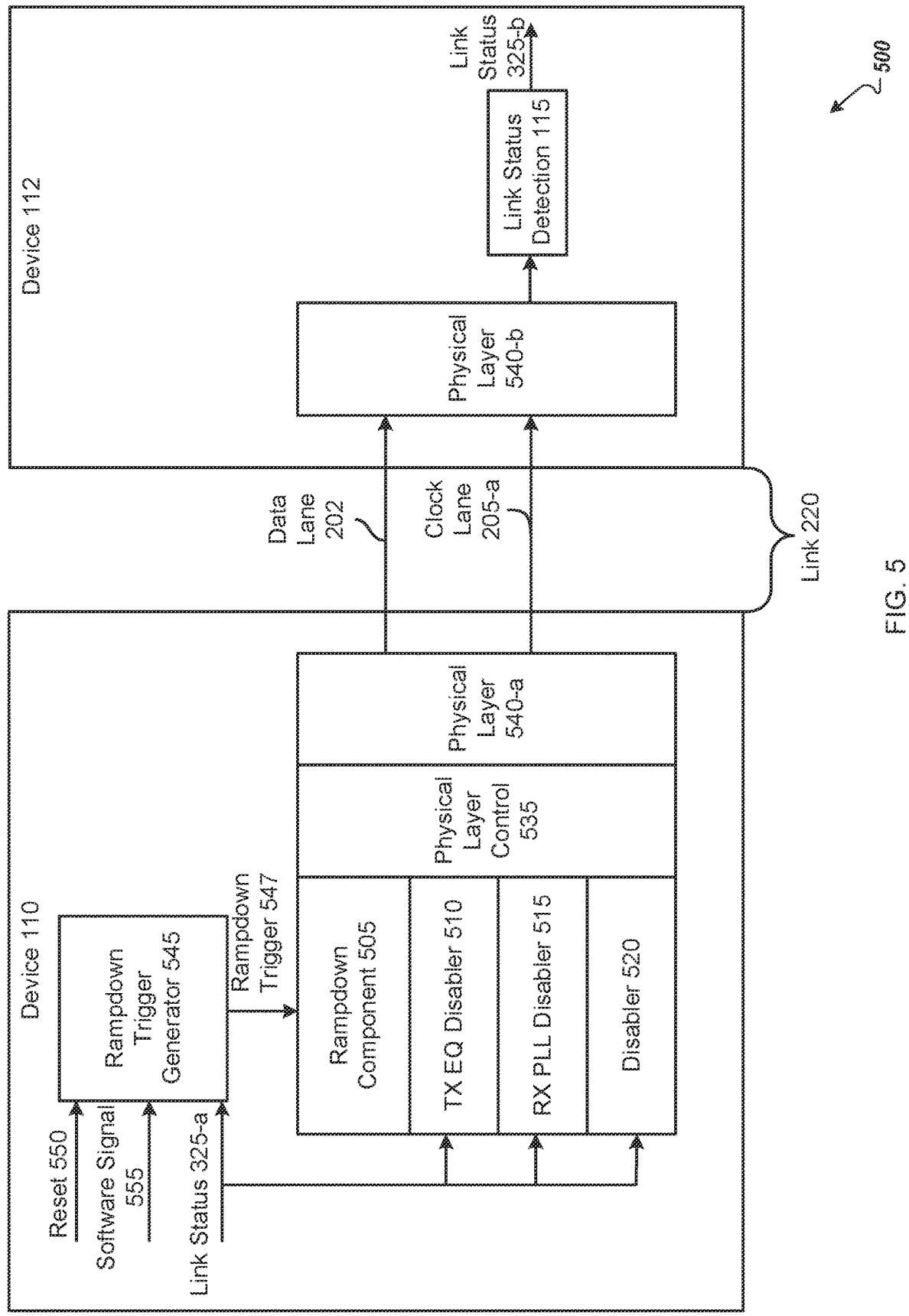
FIG. 5 is an example communication system employing a method for reliable link management, in accordance with at least some embodiments.

2-FIG. 5. In at least one embodiment, receiver 104 can include link status detection circuitry 115. In some embodiments, link status detection circuitry 115 can be configured to receive clock signals from clock lanes of the communication network 108. In some embodiments, link status detection circuitry 115 can determine the status of the communication network 108—e.g., the link status detection circuitry 115 can determine whether the link is powered on at the other device. For example, the link status detection circuitry 115 is configured to receive a clock pattern and determine a number of pulses detected over a pre-defined period. If the link status detection circuitry 115 determines the number of pulses detected satisfies an expected number of pulses, the device 110 or device 112 can determine the link is powered on at the other device. If the link status detection circuitry 115 determines the number of pulses detected fails to satisfy the expected number of pulses, the device 110 or device 112 can determine the link is powered off or reset at the other device. In such embodiments, the link status detection circuitry 115 can generate an indication (e.g., a link status) that the link is powered down at the other device and transmit the indication to a ramp-down component as described with reference to FIG. 5. The ramp-down component can initiate a power-down sequence in response to receiving the indication, enabling the device 110 or device 112 to follow the power-down sequence and maintain the reliability of the link components and components associated with the link.

The processing circuitry 132 may comprise software, hardware, or a combination thereof. For example, the processing circuitry 132 may include a memory including executable instructions and a processor (e.g., a microprocessor) that executes the instructions on the memory. The memory may correspond to any suitable type of memory device or collection of memory devices configured to store instructions. Non-limiting examples of suitable memory devices that may be used include Flash memory, Random Access Memory (RAM), Read Only Memory (ROM), variants thereof, combinations thereof, or the like. In some embodiments, the memory and processor may be integrated into a common device (e.g., a microprocessor may include integrated memory). Additionally or alternatively, the processing circuitry 132 may comprise hardware, such as an application-specific integrated circuit (ASIC). Other non-limiting examples of the processing circuitry 132 include an Integrated Circuit (IC) chip, a Central Processing Unit (CPU), a General Processing Unit (GPU), a microprocessor, a Field Programmable Gate Array (FPGA), a collection of logic gates or transistors, resistors, capacitors, inductors, diodes, or the like. Some or all of the processing circuitry 132 may be provided on a Printed Circuit Board (PCB) or collection of PCBs. It should be appreciated that any appropriate type of electrical component or collection of electrical components may be suitable for inclusion in the processing circuitry 132. The processing circuitry 132 may send and/or receive signals to and/or from other elements of the transceiver 116 to control the overall operation of the transceiver 116.

The transceiver 116 or selected elements of the transceiver 116 may take the form of a pluggable card or controller for the device 110. For example, the transceiver 116 or selected elements of the transceiver 116 may be implemented on a network interface card (NIC).

The device 112 may include a transceiver 136 for sending and receiving signals, for example, data signals over a channel 109 of the communication network 108. The same or similar structure of the transceiver 116 may be applied to transceiver 136, and thus, the structure of transceiver 136 is not described separately.

Although not explicitly shown, it should be appreciated that devices 110 and 112 and the transceivers 116 and 136 may include other processing devices, storage devices, and/or communication interfaces generally associated with computing tasks, such as sending and receiving data.

Figure 2:
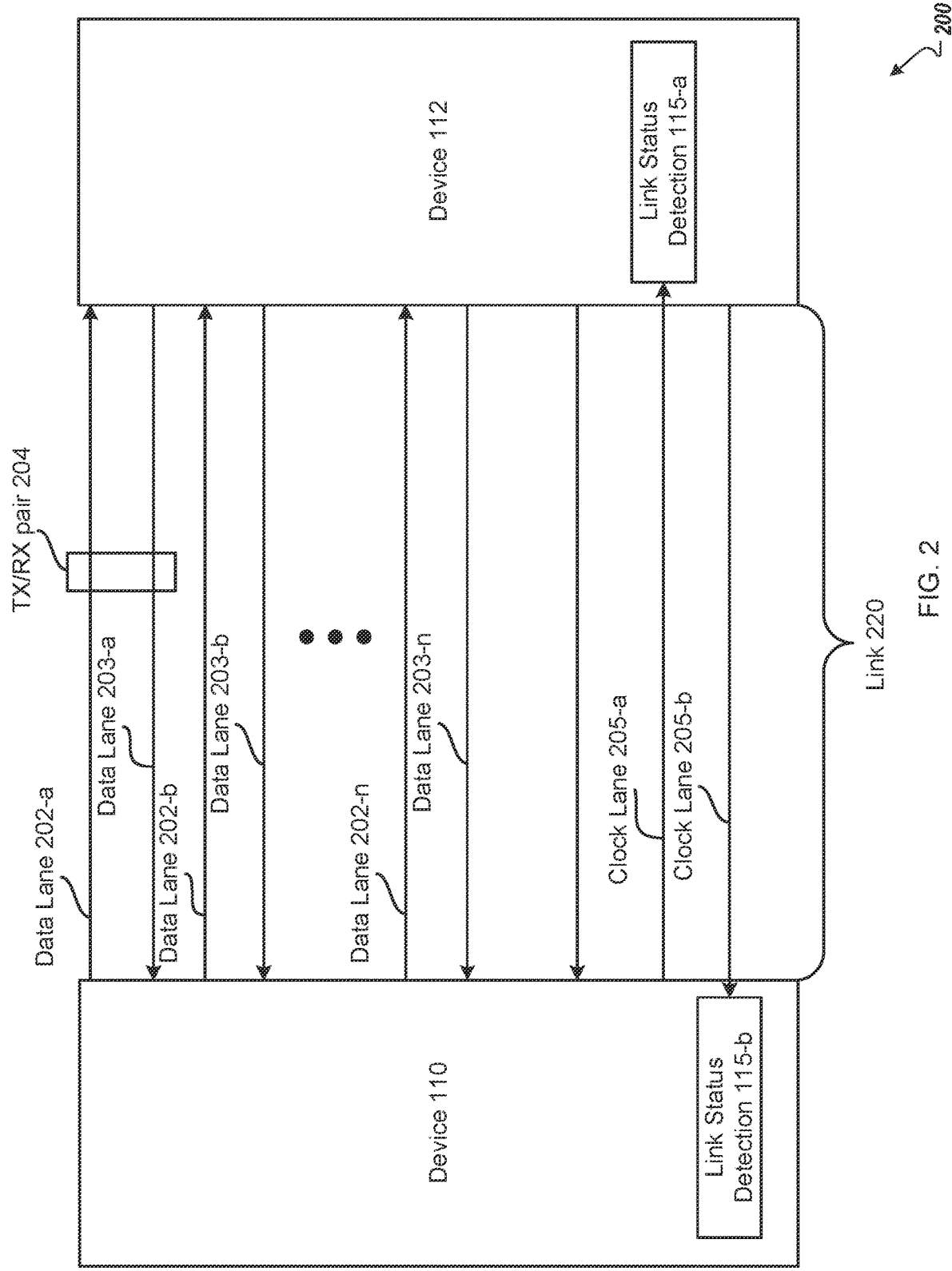
FIG. 2 illustrates an example communication system employing a method for reliable link management for a high-speed interconnect, in accordance with at least some embodiments.

FIG. 2 illustrates an example communication system 200 according to at least one example embodiment. The system 200 includes a device 110 and a device 112 as described with reference to FIG. 1. Device 110 and device 112 can include a transmitter 124 and receiver 104 as described with reference to FIG. 1. The device 110 and device 112 can be coupled to a link 220. In at least one embodiment, the link 220 can be an example of communication network 108 as described with reference to FIG. 1. In at least one embodiment, link 220 can be an example of a high-speed interconnect. For example, link 220 can be an example of a forwarded clock architecture. In one embodiment, the link 220 can be an example of a ground referenced signaling (GRS) link 220. In an embodiment, the GRS link 220 can be a signaling scheme used for serial data transfer between devices 110 and 112. In at least one embodiment, the GRS link 220 can be a high-speed link (e.g., transferring 40 gigabits per second (GBPS) at a frequency of 20 gigahertz when performing high-speed communications). In at least one embodiment, the link 220 may include RC-dominated channels and LC transmission lines. Additionally, the GRS link 220 may be an on-chip link, a link across a substrate (e.g., organic package), or link signaling over a printed circuit board (PCB). In some examples, GRS link 220 may use a ground network as a signal reference voltage—e.g., the ground may be the return signaling.

In at least one embodiment, the link 220 can include data lanes 202 and data lanes 203 configured to transmit signals, data, messages, etc., between the device 110 and device 112. For example, data lanes 202 can be associated with communicating signals, data, or messages from device 110 to device 112. Data lanes 203 can be associated with communicating signals, data, or messages from device 112 to device 110—e.g., data lanes 202 can be associated with a transmitter 124 of device 110, and data lanes 203 can be associated with a transmitter of device 112. In at least one embodiment, the link 220 can include a same number of data lanes 202 and data lanes 203. In this embodiment, a data lane 202 can be associated with a data lane 203—e.g., data lane 202-*a* and data lane 203-*a* can be a single transmitter/receiver data lane pair. In at least one embodiment, the link 220 can include an "N" number of data lane pairs—e.g., an "N" number of data lanes 202 and data lanes 203. In some embodiments, data lanes 202 can be associated with a forwarded clock lane 205-*a*, and data lanes 203 can be associated with a forwarded clock lane 205-*b*. In at least one embodiment, each clock lane can be associated with two or more data lanes—e.g., at least two data lanes 202 or data lanes 203. In at least one embodiment, data lanes 202 transmit data to device 112. In such embodiments, the data is latched on the forwarded clock at the receiver 104 of device 112. In some embodiments, data lane 202 and the corresponding data lane 203 are identical—e.g., each data lane 202 and the corresponding data lane 203 support the same signaling speed and include identical drivers and hardware.

In at least one embodiment, device 110 and device 112 can include link status detection circuitry 115. In some embodiments, the link status detection circuitry 115 can be coupled with a clock lane 205—i.e., link status detection circuitry 115-*a* can be coupled with clock lane 205-*a*, and link status detection circuitry 115-*b* can be coupled with clock lane 205-*b*. In some embodiments, a respective software stack of device 110 or device 112 can initiate a shutdown or reset of the link 220 on its side—e.g., the software stack of device 110 can shut down or reset a receiver and transmitter of device 110. In some embodiments, devices 110 and devices 112 can execute isolated software stacks—e.g., the software stack of device 110 can be unable to communicate with the software stack of device 112. To ensure a proper shutdown or power down, device 110 or device 112 has to ascertain whether the link 220 at the other device is powering down or reset. That is, components of the receiver and transmitter of devices 110 and device 112 can follow a power down (e.g., ramp down) sequence to ensure the components do not exceed a respective voltage threshold. Accordingly, device 110 and device 112 can utilize the link status detection circuitry 115 to determine a status of the link 220, and when the link 220 is is powered down or reset at the other device, initiate the power-down sequence. For example, the link status detection circuitry 115-*a* can receive a clock pattern or signal on the respective clock lane 205-*a*. The link status detection circuitry 115 can determine an average frequency of the clock pattern or signal received. In some embodiments, if the link status detection circuitry 115 determines the average frequency of the incoming clock pattern or signal satisfies an expected average frequency of a clock signal associated with transmitting data over the link 220, the link status detection circuitry 115 can determine the link 220 at the other device is active. In such embodiments, device 110 and device 112 can continue transmitting and receiving data. In some embodiments, if the link status detection circuitry 115 determines the average frequency of the incoming clock pattern or signal fails to satisfy an expected average frequency of a clock signal associated with transmitting data over the link 220, the link status detection circuitry 115 can determine the link 220 at the other device is shut down, reset, being shut down, or being reset. In such embodiments, the link status detection circuitry 115 can transmit an indication to a ramp-down component as described with reference to FIG. 5. Accordingly, the respective device 110 or device 112 can initiate a power-down sequence and ensure the components are shut down reliably without exceeding their respective threshold voltages.

Figure 3:
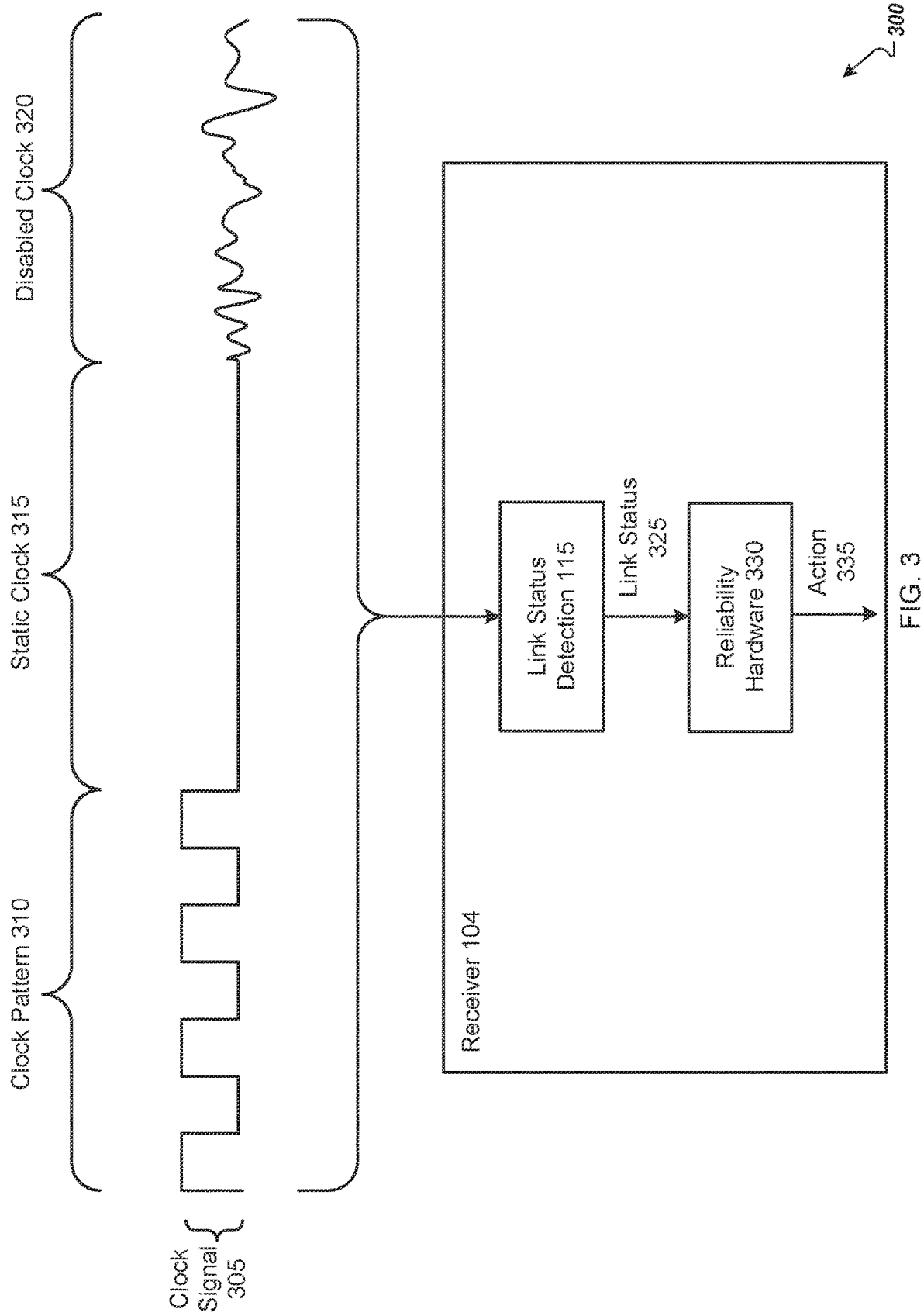
FIG. 3 is an example communication system employing a method for reliable link management, in accordance with at least some embodiments.

FIG. 3 illustrates an example communication system 300 according to at least one example embodiment. In at least one embodiment, communication system 300 is an example of communication system 100 or 200 as described with reference to FIGS. 1 and 2. The system 300 includes a receiver 104 as described with reference to FIG. 1. The receiver 104 can be in device 110 or device 112. In some embodiments, the receiver 104 can be coupled with a link 220 as described with reference to FIG. 2. The receiver 104 can include link status detection circuitry 115 and reliability hardware 330.

In some embodiments, receiver 104 can be configured to determine a link status 325 of link 220. For example, receiver 104 can monitor incoming clock signals 305 received on a clock lane (e.g., clock lane 205 as described with reference to FIG. 2) to determine the link status 325 of link 220 at the other device—e.g., the receiver 104 of device 110 can determine the link status 325 at device 110 by monitoring the incoming clock signal 305. In some embodiments, the link status 325 can indicate whether the link 220 is active or inactive at the other device—e.g., whether the link 220 is driving data or being powered down or reset.

In some embodiments, the link status detection circuitry 115 can receive the clock pattern 310 from the clock lane 205. In some embodiments, the clock pattern 310 is associated with transmitting data or an active link 220. For example, during normal operation, a transmitter (e.g., transmitter 124 as described with reference to FIG. 2) can transmit a periodic clock signal 305 on the clock lane 205, where the periodic clock signal 305 is the clock pattern 310. In some embodiments, the link status detection circuitry 115 can determine (e.g., detect) a number of pulses (e.g., a number of rising or falling edges) over a configurable period for an incoming clock signal 305. In at least one embodiment, the link status detection circuitry 115 can determine a number of pulses detected during the period that satisfies an expected number of pulses (e.g., satisfies a predetermined condition relating to a specified number of pulses for the period) when receiving the clock pattern 310. That is, link status detection circuitry 115 can be programmed to compare the detected number of pulses during the period with an expected number of pulses associated with an active link 220—e.g., associated with the periodic clock pattern 310. Because the clock pattern 310 is associated with normal operation (e.g., an active link), the link status detection circuitry 115 can determine the number of pulses detected while receiving the clock pattern 310 satisfies the expected number of pulses. In such embodiments, the link status detection circuitry 115 can transmit a link status 325, indicating the link 220 is active to the reliability hardware 330. In some embodiments, when the reliability hardware 330 receives the link status 325 indicating the link 220 is active, the reliability hardware 330 can refrain from taking an additional action 335. In at least one embodiment, the reliability hardware 330 is an example of a finite state machine (FSM) configured to initiate and manage a power-down sequence as described with reference to FIG. 5.

In some embodiments, the link status detection circuitry 115 can receive a static clock 315 from the clock lane 205. In some embodiments, the static clock 315 is associated with a device 110 or device 112, indicating it is about to be reset or powered down. For example, a software stack of device 110 can initiate a reset or shutdown of device 110. In such embodiments, device 110 can begin driving a static clock 315 on the clock lane 205 to indicate to device 112 that device 110 is being reset or shut down. In at least one embodiment, the link status detection circuitry 115 can determine a number of pulses detected during the period that fails to satisfy an expected number of pulses (e.g., fails to satisfy the predetermined condition relating to the specified number of pulses for the period) when receiving the static clock 315. That is, the static clock 315 can have a different number of pulses than the expected number of pulses associated with the clock pattern 310. In such embodiments, the link status detection circuitry 115 can transmit a link status 325, indicating the link 220 is inactive to the reliability hardware 330. In some embodiments, when the reliability hardware 330 receives the link status 325 indicating the link 220 is inactive, the reliability hardware 330 can take an action 335 to initiate the power-down sequence as described with reference to FIG. 5.

In some embodiments, the link status detection circuitry 115 can receive a disabled clock 320 (e.g., an un-driven clock 320) from the clock lane 205. In some embodiments, the disabled clock 320 is associated with device 110 or device 112 not driving anything across the clock lane 205. Because nothing is driven on the clock lane 205, the link status detection circuitry can receive random noise or toggles. In some embodiments, when the respective software stack of the device initiates the power down or reset of the link 220 or the associated components, the device can be unable to transmit the static clock 315 to indicate the shutdown. For example, the device 110 can ramp down or power down its transmitter 124 before the transmitter 124 can transmit the static clock 315. In such embodiments, there is no clock signal 305 driven on clock lane 205-*a*. Accordingly, the receiver 104 of device 112 can receive the disabled clock 320, including random noise/toggles. In at least one embodiment, the link status detection circuitry 115 can determine a number of pulses detected during the period that fails to satisfy an expected number of pulses (e.g., fails to satisfy a predetermined condition relating to a specified number of pulses for the period) when receiving the disabled clock 320. That is, the disabled clock 320 can have a different number of pulses (e.g., zero (0)) than the expected number of pulses associated with the clock pattern 310. In some embodiments, the link status detection circuitry 115 does not determine whether the static clock 315 is received or the disabled clock 320 is received—e.g., the link status detection circuitry 115 determines that the incoming signal is different than the clock pattern 310 rather than determining what specific pattern is received. In some embodiments, the link status detection circuitry 115 can transmit a link status 325, indicating the link 220 is inactive to the reliability hardware 330 when receiving the disabled clock 320. As described above, when the reliability hardware 330 receives the link status 325 indicating the link 220 is inactive, the reliability hardware 330 can take an action 335 to initiate the power-down sequence as described with reference to FIG. 5.

Figure 4:
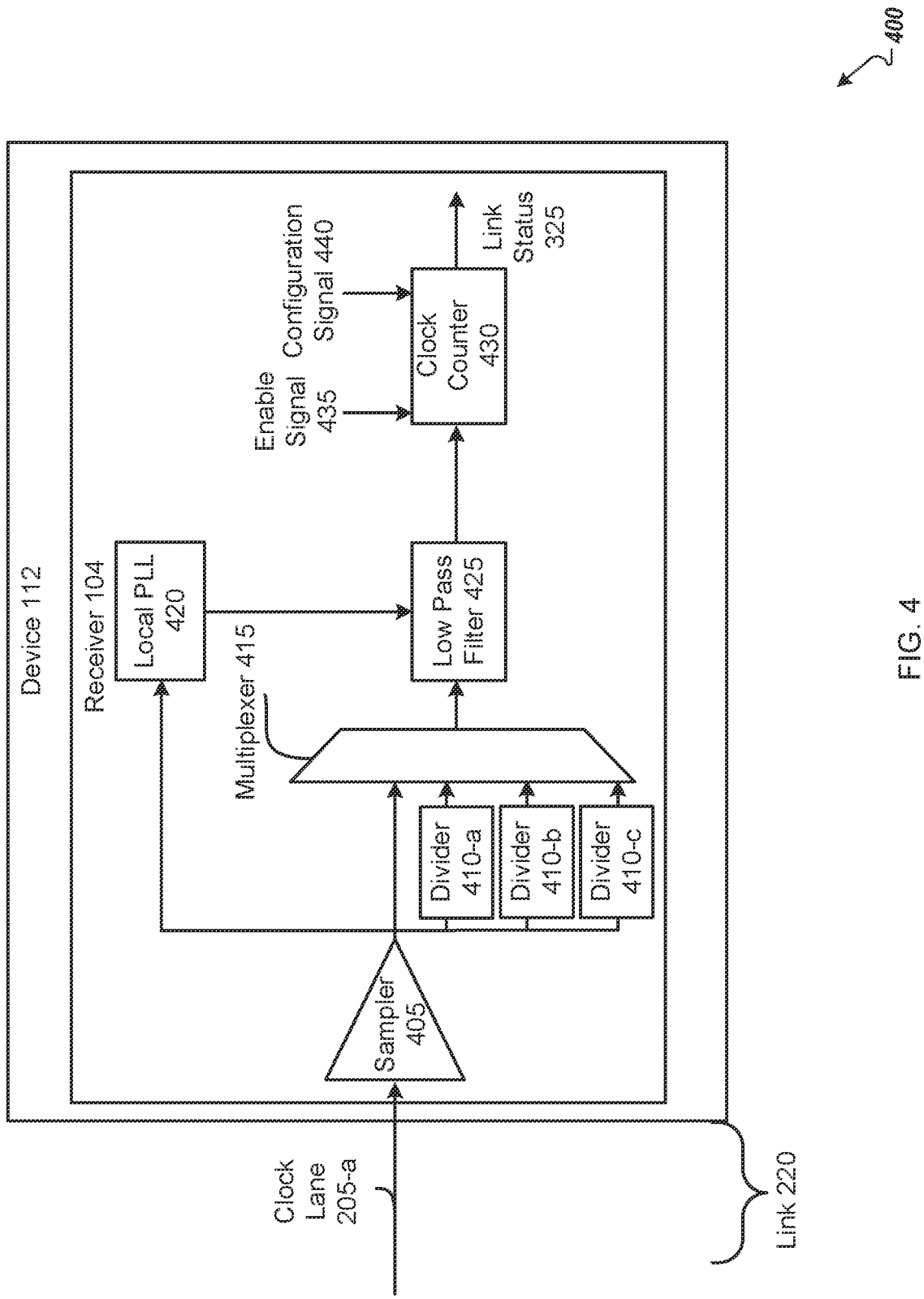
FIG. 4 is an example receiver employing a method for reliable link management for a high-speed interconnect system, in accordance with at least some embodiments.

FIG. 4 illustrates an example communication system 400 for reliable link management according to at least one embodiment. In at least one embodiment, communication system 400 is an example of communication system 100 or 200 as described with reference to FIGS. 1 and 2. The system 400 includes a device 112 as described with reference to FIG. 1. The device 112 can be coupled to a link 220 as described with reference to FIG. 2—e.g., a GRS link 220. Device 112 can include a receiver 104 as described with reference to FIG. 1. In at least one embodiment, the components illustrated in receiver 104 can be considered a part of link status detection circuitry 115 as described with reference to FIG. 1. Although FIG. 4 illustrates circuitry corresponding to clock lane 205-*a*, communication system 400 can include similar circuitry corresponding to clock lane 205-*b* as described with reference to FIG. 2. That is, device 110 can also include a receiver 104. Receiver 104 can include sampler 405, dividers 410, multiplexer 415, low pass filter (LPF) 425, local phase lock loop (PLL) 420, and clock counter 430. In some embodiments, the LPF 425, local PLL 420, and clock counter 430 can be digital logic. In at least one embodiment, clock counter 430 can be coupled to a controller or otherwise controlled by signals received from processing circuitry 132 as described with reference to FIG. 1 or receive signals from a respective software stack of device 112.

As described with reference to FIGS. 2 and 3, in some embodiments, a respective software stack of a device 110 coupled to device 112 can initiate a shutdown or reset of the link 220 at the device 110. To avoid having components of device 112 exceed voltage thresholds (e.g., to ensure a power-down sequence of device 112 is executed), the receiver 104 is configured to determine a link status 325 as described with reference to FIG. 3—e.g., determine whether the link 220 is active at the device 110.

In an embodiment, sampler 405 can be configured to receive a set of bits corresponding to a clock signal (e.g., clock signal 305 as described with reference to FIG. 3) and sample the set of bits. For example, the sampler 405 can receive a first set of bits corresponding to clock pattern 310, a second set of bits corresponding to static clock 315, or a third set of bits corresponding to disabled clock 320 as described with reference to FIG. 3. In at least one embodiment, sampler 405 can transmit the sampled set of bits received to dividers 410. In some embodiments, sampler 405 can transmit the sampled set of bits to the multiplexer 415—e.g., refrain from transmitting the sampled set of bits to the dividers 410. In some embodiments, divider 410 can be configured to divide down the frequency of the set of bits received from device 110. For example, divider 410 can be configured to divide a clock speed received by 2, 4, 8, 16, etc. In some embodiments, device 112 can configure the dividers 410 during an initialization of the receiver 104. In some embodiments, the device 112 can further divide the clock speed received from device 110 to ensure the clock signal 305 received from device 110 is reliable. Although three dividers 410 is shown, receiver 104 can include any number of dividers 410 (e.g., include 1, 2, 4, 8, 16, etc.) based on the preferred clock speed of the device 112. In some embodiments, a number of dividers 410 used can be configured by a software stack of device 112. Dividers 410 can be configured to transmit the divided clock signal 305 (e.g. the divided sampled set of bits) to the multiplexer 415. In some embodiments, the multiplexer 415 is configured to multiplex the set of bits received from the sampler 405 or the divided set of bits received from dividers 410 and transmit the multiplexed bits to the low pass filter 425.

In an embodiment, low pass filter 425 can be configured to refine further the sampled set of bits (or divided samples) from the multiplexer 415. That is, the low pass filter 425 can remove short-term fluctuations and reduce noise on the sampled set of bits to enable the clock counter 430 to receive an improved sample or signal. In at least one embodiment, the low pass filter 425 can be coupled to a local PLL 420. In some embodiments, the local PLL 420 can generate output signals for the low pass filter 425. For example, the local PLL 420 can be initialized or configured to operate at the high-speed frequency (e.g., the frequency used for data transmission operations). In such embodiments, the local PLL 420 can be used to sample the received samples at the low pass filter 425. In that, the local PLL 420 and low pass filter 425 can be utilized to get rid of high-frequency components in an output of the received clock—e.g., get rid of the higher frequencies to produce a signal with reduced noise for the clock counter 430.

In an embodiment, clock counter 430 can be configured to detect a number of pulses in the sampled set of bits (e.g., the received clock signal 305) received from the low pass filter 425 during a pre-defined period—e.g., or from the multiplexer 415 in embodiments where a low pass filter 425 is not used. In some embodiments, clock counter 430 can detect the number of pulses by determining a number of edges (e.g., the number of times the signal rises or falls) during the pre-defined duration. In that, the clock counter 430 can determine the average frequency of the sampled set of bits—e.g., determine the average frequency of the clock signal 305 received at the receiver 104 from the device 110. In some embodiments, the pre-defined period can be configurable. For example, the processing circuitry 132, a controller coupled with the clock counter 430 (e.g., a finite state machine (FSM), or a respective software stack of the receiver 104 can select a period for detecting the number of pulses. In at least one embodiment, the processing circuitry 132 can select a period from a list of programmed periods.

In some embodiments, the processing circuitry 132 can select the period based on reliability constraints of components of the receiver 104, a transmitter 124, or the link 220. For example, if receiver 104 of device 110 is powered down, transmit equalization of the transmitter 124 of device 112 can be disabled within a first period to avoid overstressing the transmitter 124—e.g., avoid components of the transmitter 124 from exceeding respective threshold voltages and degrading over time. Accordingly, in such embodiments, the processing circuitry 132 can select a period less than the first period associated with the transmitter 124 to ensure the transmit equalization is disabled before degradation occurs. In some embodiments, the processing circuitry 132 can also enable or disable the clock counter based on transmitting an enable signal 435.

In at least one embodiment, after detecting the number of pulses in the period, the clock counter 430 can compare the detected number of pulses with an expected number of pulses (e.g., predetermined condition) received via configuration signal 440. That is, the processing circuitry 132 or respective software stack of device 112 can program the expected number of pulses to the clock counter 430 via configuration signal 440. In some embodiments, the expected number of pulses is associated with a number of pulses in clock pattern 310—e.g., associated with a periodic clock signal 305 transmitted during normal operations. In some embodiments, the expected number of pulses is associated with a divided clock pattern 310. That is, the expected number of pulses can be different based on an amount the incoming clock signal 305 is divided. As the processing circuitry 132 (or the software stack) determines the amount to divide the incoming clock signal 305 by, the processing circuitry 132 (or software stack) can determine and program the expected number of pulses of the divided clock to the clock counter 430 via the configuration signal 440.

In some embodiments, if the detected number of pulses is different than the expected number of pulses, the clock counter 430 can determine the link 220 at the other device (e.g., device 110) is not active—e.g., is being shut down or reset. For example, the clock counter 430 can determine the detected number of pulses is different than the expected number of pulses when the device 110 is driving the static clock 315 or not driving a clock signal (e.g., the receiver 104 receives the disabled clock signal 320) as described with reference to FIG. 3. In such embodiments, the clock counter 345 can transmit a local link status 325 to the reliability hardware (e.g., reliably hardware 330 as described with reference to FIG. 3) of device 112, indicating that the link is not active. Accordingly, the reliability hardware can proceed with initiating and managing a power-down sequence for device 112 as described with reference to FIG. 5.

In some embodiments, if the detected number of pulses is the same as (e.g., satisfies) the expected number of pulses, the clock counter 430 can determine the link 220 at the other device (e.g., device 110) is active—e.g., is transmitting data. For example, the clock counter 430 can determine the detected number of pulses that satisfies the expected number of pulses when the device 110 is driving the clock pattern 310 as described with reference to FIG. 3. In such embodiments, the clock counter 430 can transmit a link status 325 to the reliability hardware 330 of device 112, indicating the link is active. Accordingly, the reliability hardware can refrain from initiating the power-down sequence for device 112 as described with reference to FIG. 5.

In some embodiments, the clock counter 430 can be configured to detect the number of pulses in the received clock signal 305 as being the same as the expected number of pulses for multiple periods. For example, the clock counter 430 can be configured to detect the number of pulses as being the same as the expected number of pulses for two (2) periods where each period has the same value. In other embodiments, the clock counter 430 can detect the number of pulses as being the same as the expected number of pulses for greater than two (2) periods. That is, the clock counter 430 can refrain from indicating the link is active or inactive until the specified number of periods has elapsed. In some embodiments, having the specified number of periods be greater than one (1) can increase accuracy and reduce false positives.

FIG. 5 illustrates an example communication system 500 for reliable link management according to at least one embodiment. In at least one embodiment, communication system 500 is an example of communication system 100, 200, 300, or 400 as described with reference to FIGS. 1-4. The communication system 500 includes a device 110 and a device 112 as described with reference to FIG. 1. Device 110 can be coupled to a link 220 as described with reference to FIG. 2—e.g., a GRS link 220 having one or more data lanes 202 and a clock lane 205. Device 110 can include a ramp-down component 505, a transmit equalization (TX EQ) disabler 510, receiver phase-locked loop (RX PLL) disabler 515, disabler 520, physical layer controls 535, physical layer 540-a, and ramp-down trigger generator 545. In an embodiment, the ramp-down component 505, TX EQ Disabler 510, RX PLL disabler 515, disabler 520, and ramp-down trigger generator 545 can be considered part of reliability hardware 330 as described with reference to FIG. 3. Device 112 can include physical layer 540-b and link status detection circuitry 115 as described with reference to FIG. 1. Although FIG. 5 illustrates different circuitry in device 110 and device 112, each device can have the same components. For example, device 112 can also include a ramp-down component 505, a transmit equalization (TX EQ) disabler 510, receiver phase-locked loop (RX PLL) disabler 515, disabler 520, physical layer controls 535, and ramp-down trigger generator 545, while device 110 can also include link status detection circuitry 115. In at least one embodiment, the ramp-down component 505, TX EQ disabler 510, RX PLL disabler 515, and disabler 520 are examples of finite state machines (FSMs).

In at least one embodiment, ramp-down trigger generator 545 is configured to generate a ramp-down trigger 547 based on receiving either a reset signal 550, software signal 55, or link status 325-a. For example, the ramp-down trigger generator 545 can generate the ramp-down trigger based on receiving a reset signal 550. In some embodiments, the ramp-down trigger generator 545 can receive the reset signal 550 from a hardware component. For example, the ramp-down trigger generator 545 can receive the reset signal 550 from error circuitry—e.g., the error circuitry can transmit the reset signal 550 to the ramp-down trigger generator 545 when a number of errors in the communication system 500 or device 110 exceed an error threshold. In some embodiments, the ramp-down trigger generator 545 can receive the reset signal 550 from a software stack associated with the device 110. In some embodiments, the reset signal 550 can indicate to the ramp-down trigger generator 545 to reset the link 220 or components associated with the link 220 at the device 110—e.g., reset a receiver 104 or transmitter 124 of device 110. In some embodiments, the ramp-down trigger generator 545 can generate the ramp-down trigger 547 based on receiving the software signal 555 from the software stack. In some embodiments, the software signal 555 can indicate to the ramp-down trigger generator 545 shut down or power off the link 220 or components associated with the link 220 at the device 110. In at least one embodiment, the ramp-down trigger generator 545 is configured to generate the ramp-down trigger 547 based on receiving the link status 325-*a* from the link status detection circuitry 115 of device 110. For example, the ramp-down trigger generator 545 can generate the ramp-down trigger 547 when the link status 325-*a* indicates the link is inactive at the device 112 as described with reference to FIGS. 3 and 4—e.g., device 112 drives the static clock 315, or the receiver 104 of device 110 receives the disabled clock 320. In some embodiments, the ramp-down trigger generator 545 can generate the ramp-down trigger 547 based on receiving any combination of the reset signal 550, software signal 555, and link status 325-*a*—e.g., based on receiving reset signal 550 and software signal 555, or the software signal 555 and link status 325-*a*, or receiving reset signal 550, software signal 555, and link status 325-*a*, or any combination thereof. In some embodiments, the ramp-down trigger 547 can indicate to the ramp-down component 505 to initiate a power down or ramp-down sequence associated with device 110.

In at least one embodiment, ramp-down component 505 is configured to receive the ramp-down trigger 547. In some embodiments, the ramp-down component 505 is configured to initiate the ramp-down sequence associated with device 110 based on receiving the ramp-down trigger 547. In such embodiments, the ramp-down component 505 can transmit messages, signals, or commands to the physical layer control 535 to shut down or reset analog components in the physical layer 540-*a* associated with the power-down sequence. In some embodiments, the ramp-down component 505 is configured to transmit messages, commands, or signals to the TX EQ disabler 510, RX PLL disabler 515, and disabler 520 to disable their respective components. In at least one embodiment, the software stack can program the ramp-down sequence to the ramp-down component 505—e.g., the ramp-down component 505 can initiate and manage the ramp-down sequence indicated by the software stack. Accordingly, the ramp-down component 505 can execute the same ramp-down sequence each time the ramp-down trigger 547 is received. In at least one embodiment, the ramp-down component 505 can indicate to the transmitter 124 to transmit a static clock 315 as described with reference to FIG. 3—e.g., to alert device 112 that the link 220 and associated components are powering down or resetting at device 110. In some embodiments, the ramp-down component 505 is configured to ramp down the transmitter 124 before ramping down the receiver 104. For example, the transmitter 124 can be powered down first as it can otherwise be overstressed or exceed a respective voltage threshold. In other examples, the transmitter 124 can be disabled first to enable time for device 112 to initiate a safe ramp-down sequence and reduce the time that components of device 112 are exposed to unfavorable conditions. For example, as described above, if the receiver 104 of device 110 is disabled while the transmitter 124 of device 112 is enabled, the transmitter 124 of device 112 can undergo additional stress and degrade. Accordingly, device 110 can disable its transmitter 124 first, allowing device 112 to detect the shutdown over the clock lane 205 (e.g., when the clock lane 205 is not driven) and quickly shut down its transmitter 124 before the receiver 104 of device 110 is disabled. In some embodiments, the ramp-down component 505 can ramp down the transmitter 124 at a different time—e.g., the ramp-down component 505 can disable components based on an optimal ramp-down sequence that preserves a reliability of components of device 110.

In at least one embodiment, the TX EQ disabler 510 is configured to receive the link status 325-*a* or a command/signal from the ramp-down component 505. In at least one embodiment, the TX EQ disabler 510 is configured to disable a transmitter equalization of a transmitter 124 of device 110 based on receiving the link status 325-*a* or signal from ramp-down component 505. For example, the TX EQ disabler 510 can disable the transmitter equalization of transmitter 124 when the link status 325-*a* indicates the link 220 is powering down or reset at the device 112. In some embodiments, the TX EQ disabler 510 can refrain from disabling the transmitter equalization when the link status 325-*a* indicates the link 220 is active—e.g., the link status detection circuitry 115 at the device 110 receives the clock pattern 310.

In at least one embodiment, the RX PLL disabler 515 is configured to receive the link status 325-*a* or a command/signal from the ramp-down component 505.

In at least one embodiment, the disabler 520 is configured to receive the link status 325-*a* or a command/signal from the ramp-down component 505. In at least one embodiment, the disabler 520 is configured to disable other reliability critical components of device 110 based on receiving the link status 325-*a* or signal from ramp-down component 505—e.g., other components that are reset or powered down as quick as possible after determining the link 220 is reset or powered down at the device 112. For example, the disabler 520 can disable the other reliability components when the link status 325-*a* indicates the link 220 is powering down or reset at the device 112. In some embodiments, the disabler 520 can refrain from disabling the other reliability critical components when the link status 325-*a* indicates the link 220 is active e.g., the link status detection circuitry 115 at the device 110 receives the clock pattern 310.

It should be noted that TX EQ disabler 510, RX PLL disabler 515, and disabler 520 are examples of FSMs the device 110 can utilize to perform the ramp-down sequence. In other embodiments, the device 110 can include additional FSMs for other components that are sensitive to the link 220 being disabled at device 112. In some embodiments, the TX EQ disabler 510, RX PLL disabler 515, and disabler 520 can be part of ramp-down component 505—e.g., TX EQ disabler 510, RX PLL disabler 515, and disabler 520 can be separate when it is critical to disable the TX EQ or RX PLL as quick as possible after detecting the inactive link 220 to avoid reliability issues. In other embodiments, the device 110 can follow different ramp-down procedures. For example, device 110 can perform any combination of the following operations in any order after determining the link 220 is inactive; disable reliability sensitive components of the transmitter 124, disable reliability sensitive components of the receiver 104, shut down the transmitter 124 completely, and shut down the receiver 104 completely.

Physical layer control 535 can be an interface between digital logic (e.g., the link status detection circuitry 115, TX EQ disabler 510, RX PLL disabler 515, disabler 520, ramp-down component 505, etc.) and analog components of the physical layer 540-*a*. In some embodiments, the physical layer control 535 can be an example of flops or registers. In some embodiments, the physical layer control 535 can disable analog circuitry of the physical layer 540-*a* indicated by the ramp-down component 505, TX EQ disabler 510, RX PLL disabler 515, and disabler 520.

In at least one embodiment, physical layer 540-*a* and physical layer 540-*b* are configured to transmit and receive signals and data over the link 220. The physical layer 540-*a* and physical layer 540-*b* can include the transmitter 124 and receiver 104 as described with reference to FIG. 1. In some embodiments, the physical layers 540 can be examples of analog circuitry configured to transmit and receive signals over the link 220.

As described with reference to FIGS. 2-4, the link status detection circuitry 115 is configured to detect a number of pulses of a clock signal received and determine if the detected number of pulses satisfies an expected number of pulses. In some embodiment, the link status detection circuitry 115 can generate a link status 325-b that indicates the link 220 is active when the detected number of pulses satisfies the expected number of pulses. In such embodiments, the device 112 can continue operating normally—e.g., continue transmitting, processing, and receiving data. In some embodiments, the link status detection circuitry 115 can generate a link status 325-b that indicates the link 220 is inactive when the detected number of pulses fails to satisfy the expected number of pulses. In such embodiments, the TX EQ disabler 510, RX PLL disabler 515, disabler 520, and ramp-down component 505 of device 112 can proceed with a power-down or ramp-down sequence of device 112.

Figure 6:
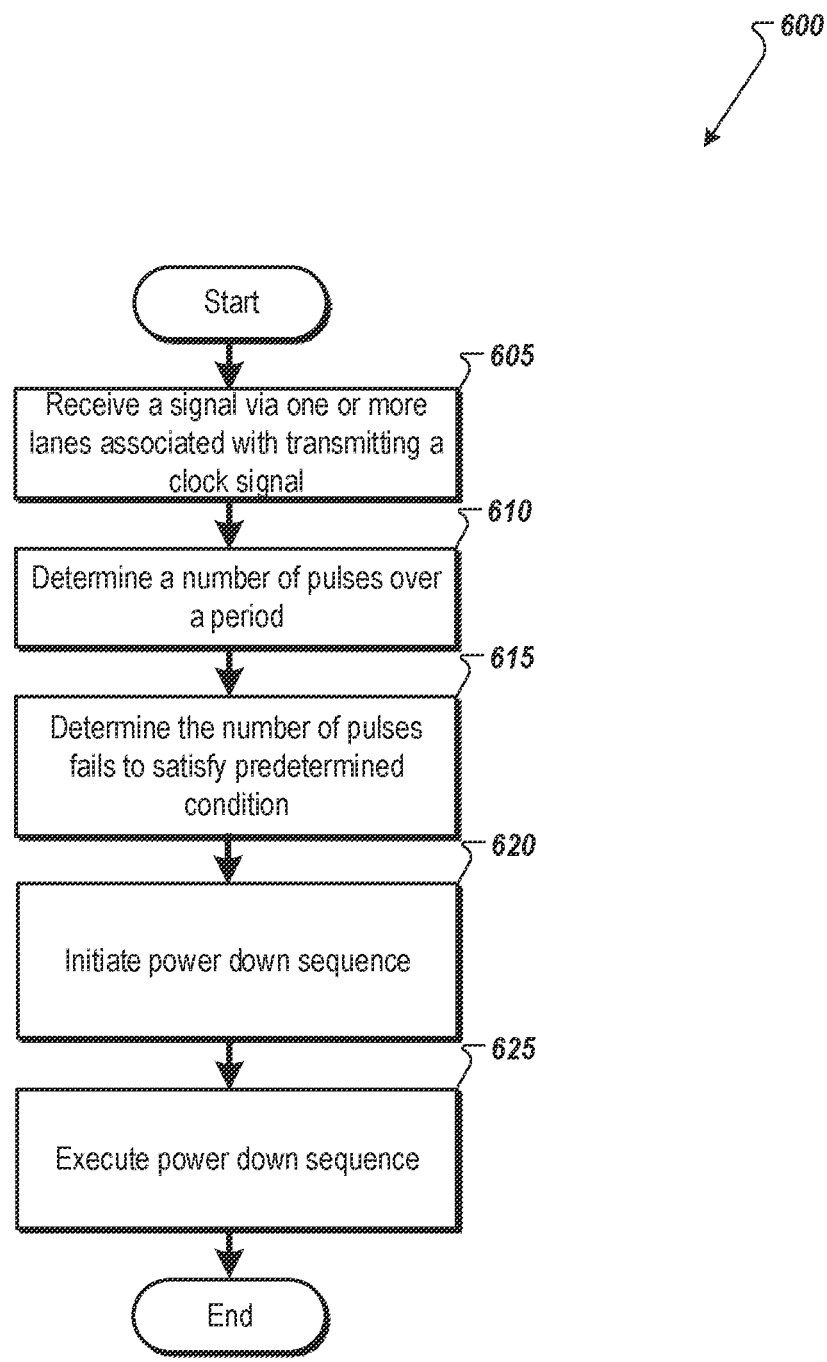
FIG. 6 is a flow diagram of a method for reliable link management for a high-speed interconnect system, in accordance with at least some embodiments.

FIG. 6 illustrates an example flow diagram of a method 600 for reliable link management for a high-speed interconnect. The method 600 can be performed by processing logic comprising hardware, software, firmware, or any combination thereof. In at least one embodiment, the method 600 is performed by the transmitter 124 or receiver 104 of the first device 110 or second device 112 as described with reference to FIG. 3—e.g., by TX EQ disabler 510, RX PLL disabler 515, disabler 520, ramp-down component 505, ramp-down trigger generator 545, and link status detection circuitry 115. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other diagrams illustrating a method for reliable link management are possible.

At operation 605, processing logic can receive a signal via one or more lanes associated with transmitting a clock signal. For example, a system can include a link (e.g., link 220) including one or more lanes associated with transmitting data (e.g., data lanes 202 and 203) and one or more lanes associated with transmitting the clock signal (e.g., clock lane 205). In some embodiments, the processing logic can receive a set of bits associated with a pattern via the one or more lanes associated with transmitting the clock signal, where the pattern is different than a second pattern associated with a data transmission operation—e.g., the signal received can be the set of bits. For example, the processing logic can be in a second device (e.g., device 112), and a first device (e.g., device 110) can transmit the set of bits. In some embodiments, the set of bits can be associated with static clock 315, and the second pattern can be associated with clock pattern 310 as described with reference to FIG. 3. In some embodiments, the processing logic can receive a second set of bits associated with the second pattern via the one or more lanes associated with transmitting the clock signal—e.g., the processing logic can receive the clock pattern 310. In at least one embodiment, the processing logic can receive the signal in response to the first device initiating a power-down sequence (e.g., a second power-down sequence). In some embodiments, the processing logic can determine the number of pulses associated with the set of bits fails to satisfy a predetermined condition relating to a specified number of pulses for a period in response to the first or second device transmitting the signal—e.g., fail to satisfy an expected number of pulses for the period as described with reference to FIGS. 3 and 4.

At operation 610, processing logic can determine a number of pulses associated with the signal (e.g., or the set of bits or the second set of bits) over a period. In at least one embodiment, the processing logic is configured to select the period during which the number of pulses is determined from a plurality of periods—e.g., the period is configurable. In some embodiments, the processing logic can select the period based on a reliability condition of a component of the first device or second device—e.g., select the period based on a concern that transmitter 124 of the second device can overstress enabled while the receiver of the first device is disabled. In some embodiments, the processing logic can select a subset of a set of dividers (e.g., dividers 410) to divide the signal received, where determining the number of pulses associated with the signal over the period is in response to selecting the subset of the set of dividers.

At operation 615, processing logic can determine the number of pulses associated with the signal fails to satisfy a predetermined condition relating to a specified number of pulses for the period. For example, the processing logic can determine the number of pulses associated with the set of bits fails to satisfy the predetermined condition relating to the specified number of pulses for the period. In some embodiments, the processing logic can determine the number of pulses of the signal received in response to the first device initiating the power-down sequence fails to satisfy the predetermined condition—e.g., the number of pulses detected during the period for the static clock 315 and disabled clock 320 fail to satisfy the predetermined condition relating to the specified number of pulses for the period. In some embodiments, if the processing logic determines the number of pulses fails to satisfy the predetermined condition, the processing logic can proceed to operation 620. In at least one embodiment, the processing logic can determine the number of pulses associated with the signal (e.g., the second set of bits) satisfy the predetermined condition relating to the specified number of pulses for the period—e.g., the number of pulses detected for the period while receiving the clock pattern 310 satisfies the predetermined condition. In such embodiments, the processing logic can refrain from initiating a power-down sequence in response to determining the number of pulses that satisfies the predetermined condition. In at least one embodiment, the processing logic can determine the number of pulses associated with the signal satisfies the predetermined condition relating to the specified number of pulses for the period a quantity of times, where the quantity of times satisfies a threshold number of times the signal satisfies the number of pulses for the period—e.g., the processing logic can determine the number of pulses over the period fails to satisfy the predetermined for multiple periods.

At operation 620, the processing logic can initiate a power-down sequence in response to determining the number of pulses that fails to satisfy the predetermined condition relating to the specified number of pulses for the period. For example, the ramp-down trigger generator 545 can generate a ramp-down trigger 547 in response to the number of pulses failing to satisfy the predetermined condition. In at least one embodiment, the processing logic can initiate the power-down sequence in response to receiving a reset signal from a component associated with the link—e.g., based on receiving reset signal 550 from a hardware component associated with the link as described with reference to FIG. 5. In at least one embodiment, the processing logic can initiate the power-down sequence in response to receiving a second signal from a software stack associated with the device—e.g., based on receiving software signal 555 as described with reference to FIG. 5.

At operation 625, the processing logic can execute the power-down sequence. For example, the processing logic can disable transmitter equalization in response to determining the number of pulses does not satisfy the predetermined condition. In some embodiments, the processing logic can disable a receiver in response to disabling the transmitter. In some embodiments, the processing logic can execute a power-down sequence as described with reference to FIG. 5.

Figure 7:
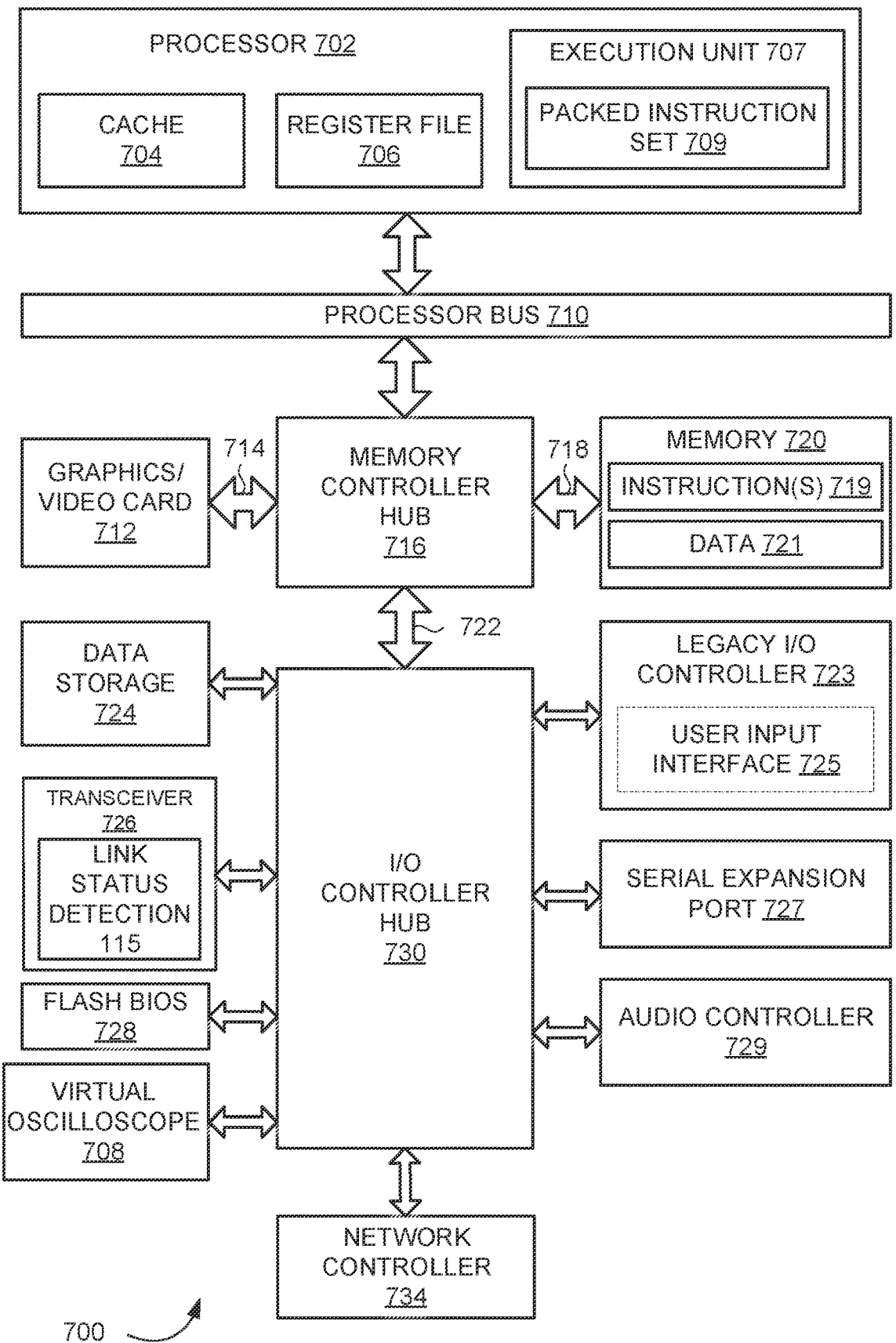
FIG. 7 illustrates an example computer system including a transceiver including a chip-to-chip interconnect for reliable link management, in accordance with at least some embodiments.

FIG. 7 illustrates a computer system 700 including a transceiver including a chip-to-chip interconnect, in accordance with at least one embodiment. In at least one embodiment, computer system 700 may be a system with interconnected devices and components, an SOC, or some combination. In at least one embodiment, computer system 700 is formed with a processor 702 that may include execution units to execute an instruction. In at least one embodiment, computer system 700 may include, without limitation, a component, such as processor 702, to employ execution units including logic to perform algorithms for processing data. In at least one embodiment, computer system 700 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 700 may execute a version of WINDOWS' operating system available from Microsoft Corporation of Redmond, Wash., although other operating systems (UNIX and Linux for example), embedded software, and/or graphical user interfaces may also be used.

In at least one embodiment, computer system 700 may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor (DSP), an SoC, network computers ("NetPCs"), set-top boxes, network hubs, wide area network ("WAN") switches, or any other system that may perform one or more instructions. In an embodiment, computer system 700 may be used in devices such as graphics processing units (GPUs), network adapters, central processing units and network devices such as switch (e.g., a high-speed direct GPU-to-GPU interconnect such as the NVIDIA GH100 NVLINK or the NVIDIA Quantum 2 64 Ports InfiniBand NDR Switch).

In at least one embodiment, computer system 700 may include, without limitation, processor 702 that may include, without limitation, one or more execution units 707 that may be configured to execute a Compute Unified Device Architecture ("CUDA") (CUDA® is developed by NVIDIA Corporation of Santa Clara, CA) program. In at least one embodiment, a CUDA program is at least a portion of a software application written in a CUDA programming language. In at least one embodiment, computer system 700 is a single-processor desktop or server system. In at least one embodiment, computer system 700 may be a multiprocessor system. In at least one embodiment, processor 702 may include, without limitation, a CISC microprocessor, a RISC microprocessor, a VLIW microprocessor, a processor implementing a combination of instruction sets, or any other processor device, such as a digital signal processor, for example. In at least one embodiment, processor 702 may be coupled to a processor bus 710 that may transmit data signals between processor 702 and other components in computer system 700.

In at least one embodiment, processor 702 may include, without limitation, a Level 1 ("L1") internal cache memory ("cache") 704. In at least one embodiment, processor 702 may have a single internal cache or multiple levels of internal cache. In at least one embodiment, cache memory may reside external to processor 702. In at least one embodiment, processor 702 may also include a combination of both internal and external caches. In at least one embodiment, a register file 706 may store different types of data in various registers including, without limitation, integer registers, floating point registers, status registers, and instruction pointer register.

In at least one embodiment, execution unit 707, including, without limitation, logic to perform integer and floating point operations, also resides in processor 702. Processor 702 may also include a microcode ("ucode") read only memory ("ROM") that stores microcode for certain macro instructions. In at least one embodiment, execution unit 707 of processor 702 may include logic to handle a packed instruction set 709. In at least one embodiment, by including packed instruction set 709 in an instruction set of a general-purpose processor 702, along with associated circuitry to execute instructions, operations used by many multimedia applications may be performed using packed data in a general-purpose processor 702. In at least one embodiment, many multimedia applications may be accelerated and executed more efficiently by using full width of a processor's data bus for performing operations on packed data, which may eliminate a need to transfer smaller units of data across a processor's data bus to perform one or more operations one data element at a time.

In at least one embodiment, an execution unit may also be used in microcontrollers, embedded processors, graphics devices, DSPs, and other types of logic circuits. In at least one embodiment, computer system 700 may include, without limitation, a memory 720. In at least one embodiment, memory 720 may be implemented as a DRAM device, an SRAM device, flash memory device, or other memory device. Memory 720 may store instruction(s) 719 and/or data 721 represented by data signals that may be executed by processor 702.

In at least one embodiment, a system logic chip may be coupled to processor bus 710 and memory 720. In at least one embodiment, the system logic chip may include, without limitation, a memory controller hub ("MCH") 716, and processor 702 may communicate with MCH 716 via processor bus 710. In at least one embodiment, MCH 716 may provide a high bandwidth memory path 718 to memory 720 for instruction and data storage and for storage of graphics commands, data and textures. In at least one embodiment, MCH 716 may direct data signals between processor 702, memory 720, and other components in computer system 700 and to bridge data signals between processor bus 710, memory 720, and a system I/O 722. In at least one embodiment, a system logic chip may provide a graphics port for coupling to a graphics controller. In at least one embodiment, MCH 716 may be coupled to memory 720 through high bandwidth memory path 718, and graphics/video card 712 may be coupled to MCH 716 through an Accelerated Graphics Port ("AGP") interconnect 714.

In at least one embodiment, computer system 700 may use system I/O 722 that is a proprietary hub interface bus to couple MCH 716 to I/O controller hub ("ICH") 730. In at least one embodiment, ICH 730 may provide direct connections to some I/O devices via a local I/O bus. In at least one embodiment, a local I/O bus may include, without limitation, a high-speed I/O bus for connecting peripherals to memory 720, a chipset, and processor 702. Examples may include, without limitation, an audio controller 729, a firmware hub ("flash BIOS") 728, a transceiver 726, a data storage 724, a legacy I/O controller 723 containing a user input interface 725 and a keyboard interface, a serial expansion port 727, such as a USB, and a network controller 734. Data storage 724 may comprise a hard disk drive, a floppy disk drive, a CD-ROM device, a flash memory device, or other mass storage device.

In at least one embodiment, FIG. 7 illustrates a system, which includes interconnected hardware devices or "chips" in the transceiver 726—e.g., the transceiver 726 includes a chip-to-chip interconnect including the first device 110 and second device 112 as described with reference to FIG. 1). In at least one embodiment, FIG. 7 may illustrate an exemplary SoC. In at least one embodiment, devices illustrated in FIG. 7 may be interconnected with proprietary interconnects, standardized interconnects (e.g., PCIe), or some combination thereof and utilize a GRS link 220 as described with reference to FIG. 2. In at least one embodiment, one or more components of system 700 are interconnected using compute express link ("CXL") interconnects. In an embodiment, the transceiver 726 can include link status detection circuitry 115. In some embodiments, link status detection circuitry 115 can determine whether the link is powered on at the other device. If the link status detection circuitry 115 determines the link is not powered on at the other device, the link status detection circuity 115 can generate an indication (e.g., a link status) that the link is powered down at the other device and transmit the indication to a ramp-down component as described with reference to FIG. 5. The ramp-down component can initiate a power-down sequence in response to receiving the indication, enabling the chip to follow the power-down sequence and maintain the reliability of the link components and components associated with the link. Accordingly, the link status detection circuitry 115 can be configured for reliable link management as described with reference to FIGS. 2-6.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A system comprising:
    a link comprising one or more lanes associated with transmitting data and one or more lanes associated with transmitting a clock signal; and
    a device coupled with the link and comprising a receiver, the device to:
        receive a signal via the one or more lanes associated with transmitting the clock signal;
        determine a number of pulses associated with the signal over a period;
        determine the number of pulses associated with the signal fail to satisfy a predetermined condition relating to a specified number of pulses for the period; and
        initiate a power-down sequence in response to determining the number of pulses fails to satisfy the predetermined condition relating to the number of pulses for the period.

2. The system of claim 1, wherein the device is further to:
    determine the number of pulses satisfies the predetermined condition relating to the specified number of pulses for the period; and
    refrain from initiating the power-down sequence in response to determining the number of pulses satisfies the predetermined condition.

3. The system of claim 1, wherein the device is further to:
    receive a reset signal from a component associated with the link, wherein initiating the power-down sequence is based at least in part on receiving the reset signal.

4. The system of claim 1, wherein the device is further to:
receive a second signal from a software stack associated with the device, wherein initiating the power-down sequence is based at least in part on receiving the second signal.

5. The system of claim 1, wherein the device further comprises a set of dividers, the device to:
select a subset of the set of dividers to divide the signal received, wherein determining the number of pulses associated with the signal over the period is in response to selecting the subset of the set of dividers.

6. The system of claim 1, wherein the device is further to:
select the period during which the number of pulses are determined from a plurality of periods.

7. The system of claim 1, wherein the device is further to:
determine the number of pulses associated with the signal fails to satisfy the predetermined condition relating to the specified number of pulses for the period a quantity of times, wherein the quantity of times satisfies a threshold number of times the signal satisfies the number of pulses for the period.

8. The system of claim 1, wherein the device further comprises a transmitter, the device is further to:
disable transmitter equalization in response to determining the number of pulses does not satisfy the predetermined condition relating to the specified number of pulses for the period; and
disable the receiver in response to disabling the transmitter equalization.

9. The system of claim 1, further comprising a second device, the second device to:
transmit the signal over the one or more lanes associated with transmitting the clock signal, wherein the device is to determine the number of pulses associated with the signal fails to satisfy the predetermined condition in response to the second device transmitting the signal.

10. A method, comprising:
receiving a signal from one or more lanes associated with transmitting a clock signal of a link;
determining a number of pulses associated with the signal over a period;
determining the number of pulses associated with the signal fails to satisfy a predetermined condition relating to a specified number of pulses for the period; and
initiating a power-down sequence in response to determining the number of pulses fails to satisfy the predetermined condition relating to the specified number of pulses for the period.

11. The method of claim 10, further comprising:
determining the number of pulses satisfies the predetermined condition relating to the specified number of pulses for the period; and
refraining from initiating the power-down sequence in response to determining the number of pulses satisfies the predetermined condition.

12. The method of claim 10, further comprising:
receiving a reset signal from a component associated with the link, wherein initiating the power-down sequence is based at least in part on receiving the reset signal.

13. The method of claim 10, further comprising:
receiving a second signal from a software stack, wherein initiating the power-down sequence is based at least in part on receiving the second signal.

14. The method of claim 10, further comprising:
selecting a subset of a set of dividers to divide the signal received, wherein determining the number of pulses associated with the signal over the period is in response to selecting the subset of the set of dividers.

15. The method of claim 10, further comprising:
selecting the period during which the number of pulses are determined from a plurality of periods.

16. The method of claim 10, further comprising:
determining the number of pulses associated with the signal fails to satisfy the predetermined condition relating to the specified number of pulses for the period a quantity of times, wherein the quantity of times satisfies a threshold number of times the signal satisfies the number of pulses for the period.

17. The method of claim 10, further comprising:
disabling a transmitter equalization in response to determining the number of pulses does not satisfy the predetermined condition relating to the specified number of pulses for the period; and
disabling a receiver in response to disabling the transmitter equalization.

18. A system comprising:
a link comprising one or more lanes associated with transmitting data and one or more lanes associated with transmitting a clock signal;
a first device coupled with the link and comprising a transmitter, the first device to:
transmit a set of bits associated with a pattern via the one or more lanes associated with transmitting the clock signal, wherein the pattern is different than a second pattern associated with a data transmission operation; and
a second device coupled with the link and comprising a receiver, the second device to:
receive the set of bits associated with the pattern;
determine a number of pulses associated with the set of bits over a period;
determine the number of pulses associated with the set of bits fails to satisfy a predetermined condition relating to a specified number of pulses for the period; and
initiate a power-down sequence in response to determining the number of pulses fails to satisfy the predetermined condition relating to the specified number of pulses for the period.

19. The system of claim 18, wherein:
the first device is further to:
transmit a second set of bits associated with the second pattern via the one or more lanes associated with transmitting the clock signal; and
the second device is further to:
receive the second set of bits associated with the second pattern;
determine a second number of pulses associated with the second set of bits over the period;
determine the second number of pulses associated with the second set of bits satisfies the predetermined condition relating to the specified number of pulses for the period; and
refrain from initiating the power-down sequence in response to determining the second number of pulses satisfies the predetermined condition relating to the specified number of pulses for the period.

20. The system of claim 18, wherein:
the first device is further to:
power down the transmitter in response to initiating a second power-down sequence; and the second device is further to:
- receive a signal via the one or more lanes associated with transmitting the clock signal in response to the first device initiating the second power-down sequence;
- determine a second number of pulses associated with the signal over the period;
- determine the second number of pulses associated with the signal fail to satisfy the predetermined condition relating to the specified number of pulses for the period; and
- initiate the power-down sequence in response to determining the second number of pulses fails to satisfy the predetermined condition relating to the specified number of pulses for the period.

* * * * *